United States Patent Office 3,564,041
Patented Feb. 16, 1971

---

3,564,041
1,2,3-TRIHYDROCARBYLGUANIDINE-1-CARBOXYLATES
William J. Farrissey, North Branford, Conn., and Raymond J. Ricciardi, Snyder, N.Y., assignors to The Upjohn Company, Kalamazoo, Mich., a corporation of Delaware
No Drawing. Filed Apr. 26, 1967, Ser. No. 633,685
Int. Cl. C07c 133/10
U.S. Cl. 260—471                                6 Claims

ABSTRACT OF THE DISCLOSURE

A novel process for the preparation of 1,2,3-trihydrocarbyl guanidine-1-carboxylic acid esters and amides by reaction of the corresponding 1,3-dihydrocarbyl-4-hydrocarbylimino-uretidine-2-one with an amine or hydroxyl group containing compound in the presence of a catalyst. Catalysts are saturated aliphatic acids and alkali metal salts thereof, alkali metal phenoxides and alkali metal alkoxides. The guanidine derivatives so obtained are novel compounds useful as stabilizing agents for polyolefins, and as intermediates for polyurethanes.

BACKGROUND OF THE INVENTION

(1) Field of the invention

This invention relates to novel guanidine derivatives and to processes for their preparation and is more particularly concerned with novel 1,2,3-trihydrocarbyl-guanidine-1-carboxylic acid esters and amides and with processes for their preparation from the corresponding 1,3-dihydrocarbyl-4-hydrocarbyliminouretidone-2-ones and with novel compounds derived from said 1,2,3-trihydrocarbyl-guanidine-1-carboxylic acid esters and amides.

(2) Description of the prior art

The preparation of certain 1,2,3-triaryl-3-alkyl-substituted guanidine-1-carboxylates by reaction of the appropriately substituted guanidines with methyl chloroformate, has been described by Junod, Helv. Chim. Acta, 35, 1005–20 and 1667–70, 1952. The preparation of 3,3-dialkyl-guanidine-1-carboxylic acid N,N-dialkylamides by alkali metal hydroxide hydrolysis of the intermediate tetraalkyl-guanyl chloroformamidine hydrohalide has been described in U.S. 2,179,174. The preparation of 1,2,3,3-tetramethyl-guanidine-1-carboxylic acid N,N-dimethylamide by reaction of mercuric oxide with tetramethyl thiourea in benzene solution followed by reaction of the 1-(trimethylguanyl)-1,3,3-trimethyl-2-thiourea with mercuric oxide under aqueous conditions, has been described by Lecher et al. J. Am. Chem. Soc. 75, 1087, 1953. It has not previously been suggested that 1,2,3-trihydrocarbyl-guanidine-1-carboxylic acid amides and esters can be made readily and, for the most part, in good yield from the corresponding 1,3-dihydrocarbyl-4-hydrocarbyliminouretidine-2-ones which latter are themselves readily obtained as the adduct of a hydrocarbyl isocyanate and a dihydrocarbyl carbodiimide.

SUMMARY OF THE INVENTION

It is an object of this invention to provide such a synthesis of 1,2,3 - trihydrocarbyl - guanidine-1-carboxylic acid amides and esters from the corresponding 1,3-dihydrocarbyl-4-hydrocarbylimino-uretidine - 2 - ones. It is a further object of this invention to provide novel 1,2,3-trihydrocarbyl-guanidine-1-carboxylic acid amides and esters.

The novel process of the invention, in its broadest aspect, comprises a process for the preparation of a 1,2,3-trihydrocarbyl-guanidine-1-carboxylic acid derivative having the formula:

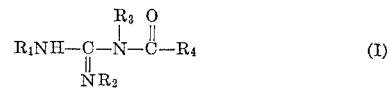

wherein $R_1$, $R_2$ and $R_3$ each represent hydrocarbyl from 1 to 18 carbon atoms, inclusive, and $R_4$ is selected from the class consisting of $-OR_5$ and

wherein $R_5$, $R_6$ and $R_7$ each represent hydrocarbyl from 1 to 18 carbon atoms, inclusive, and $R_6$ additionally represents hydrogen, which process comprises reacting at a temperature below that at which the starting material dissociates, a uretidinone of the formula:

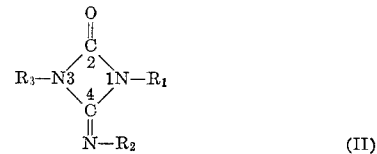

wherein $R_1$, $R_2$ and $R_3$ have the significance hereinbefore defined, with an active hydrogen containing compound $R_4H$ (III) wherein $R_4$ is as hereinabove defined, in the presence of a catalyst selected from the group consisting of a saturated lower aliphatic acid, an alkali metal salt of a saturated lower aliphatic acid, a mixture of a saturated lower aliphatic acid and the alkali metal derivative of a saturated lower aliphatic acid, the alkali metal derivative of a phenol and the alkali metal salt of a lower alkanol.

The numbering shown in the ring of the uretidinone shown in Formula II is that adopted by Chemical Abstracts; said numbering will be adopted throughout this specification in naming the uretidinones specifically mentioned herein.

The term "hydrocarbyl from 1 to 18 carbon atoms, inclusive" means the monovalent radical obtained by removing one hydrogen atom from the parent hydrocarbon having the stated carbon atom content. Illustrative of such radicals are alkyl such as methyl, ethyl, propyl, butyl, pentyl, hexyl, octyl, decyl, dodecyl, undecyl, hexadecyl, octadecyl, and the like, including isomeric forms thereof; alkenyl such as allyl, butenyl, pentenyl, hexenyl, octenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, benzylphenyl, and the like; cycloalkyl such as cyclobutyl, cyclopentyl, cyclohexyl, cycloheptyl, cyclooctyl, and the like, including isomeric forms thereof; cycloalkenyl such as cyclopentenyl, cyclohexenyl, cycloheptenyl and the like, including isomeric forms thereof.

The hydrocarbyl groups $R_1$, $R_2$, $R_3$, $R_5$, $R_6$, and $R_7$ present in the compounds of Formulae I, II and III above can be unsubstituted i.e. can be free of groups other than those containing exclusively carbon and hydrogen, or can be substituted by one or more groups which are inert under the conditions of the reaction i.e. do not enter into competing reactions with the other reactants, including catalysts, present in the reaction mixture. Illustrative of such groups are halo, nitro, alkoxy, alkylmercapto, alkenyloxy, cyano, and "capped isocyanato." The term "alkoxy" as used throughout the specification and claims means alkoxy containing from 1 to 8 carbon atoms, inclusive, such as methoxy, ethoxy, propoxy, butoxy, pentyloxy, hexyloxy, heptyloxy, octyloxy, and the like, including isomeric forms thereof. The term "alkylmercapto" as used throughout the specification and claims means alkylmercapto containing from 1 to 8 carbon atoms such as methylmercapto, ethylmercapto, propylmercapto, butylmercapto, pentylmercapto, hexylmercapto, heptylmercapto, octylmercapto, and the like, including isomeric forms thereof. The term "halo" as used throughout this specification and claims has its normal meaning and embraces fluoro, chloro, bromo, and iodo. The term "alkenyloxy" as used throughout the specification and claims means alkenyloxy containing from 3 to 8 carbon atoms such as allyloxy, butenyloxy, pentenyloxy, hexenyloxy, heptenyloxy, octenyloxy, and the like, including isomeric forms thereof.

The term "capped isocyanato" as used throughout the specification and claims means an isocyanato group which has been "capped" i.e. rendered non-reactive toward active hydrogen containing compounds by reaction with an active hydrogen containing compound preferably one which is heat releasable (regenerates free isocyanato on heating). Examples of capping agents which are heat releasable are aliphatic alcohols such as methanol, ethanol, isopropyl alcohol, butanol, octanol, dodecanol and the like; phenols such as phenol itself, o-cresol, m-cresol, p-cresol, p-tert.-butylphenol, hydroquinone monobenzyl ether and the like; mercaptans for example methylmercaptan, ethyl mercaptan, butyl mercaptan, decyl mercaptan, phenyl mercaptan, 2-mercapto thiazole, and the like; lactams, for example ε-caprolactam, δ-valerolactam, δ-butyrolactam (2-pyrrolidone), β-propiolactam, and the like; imides, for example succinimide, phthalimide, naphthalimide, glutarimide, and the like; secondary amines, for example, dimethylamine, diethylamine, diisobutylamine, diphenylamine, N-phenyl-β-naphthylamine, 1,2-dihydroquinoline, and the like; N-mono-substituted aliphatic acid amides, for example N-methylacetamide, N-ethylacetamide, N-methylbutyramide, N-isopropylacetamide, and the like. The "capped isocyanato" groups can be reconverted to isocyanato groups, e.g. by heating the compound, in whose molecule they are present, to a temperature of the order of about 100° C. to about 200° C.

Wherever reference is made in this specification to "active hydrogen containing groups" said term has its conventional meaning designating a group which gives a positive reaction in the Zerewitinoff method, J. Am. Chem. Soc. 49, 3181, 1927.

The term "alkali metal" as used throughout the specification and claims means sodium, potassium and lithium. The term "saturated lower aliphatic acid" means an alkanic acid having from 1 to 8 carbon atoms, inclusive, such as acetic, propionic, butyric, caproic, hexanoic, heptanoic, and octanoic acids and the like including isomeric forms thereof. The term "alkali metal derivative of a phenol" employed in defining certain of the catalysts of the invention means the alkali metal derivative of a compound R—OH where R represents aryl as herein before defined. The term "alkali metal derivative of a lower alkanol" employed in defining certain of the catalysts of the invention means the alkali metal derivative of an alkanol having from 1 to 8 carbon atoms, inclusive, such as methanol, ethanol, propanol, butanol, pentanol, hexanol, heptanol, octanol and the like including isomeric forms thereof.

The compounds of the Formula I above are novel compounds which are useful for a variety of purposes. Illustratively, the compounds of Formula I can be used as antioxidants for hydrocarbon polymers such as natural rubber, butyl rubber (i.e. the elastomeric polymers formed by polymerizing a major portion of an isoolefin such as isobutylene with a minor portion of a conjugated diene such as isoprene, butadiene, piperylene, dimethylbutadiene, and the like), butadiene copolymers with copolymerisable monomers such as styrene and acrylonitrile, polyisoprene, polybutadiene, neoprene (polychloroprene), polyethylene, ethylene-propylene copolymers, ethylene-propylene terpolymers, and the like. When employed for this purpose, the requisite amount of the compound (I), generally from about 1% to 5% by weight based on the polymer, is incorporated into the curable mixture at the time at which the polymer is being cured in accordance with procedures known in the art; see, for example, Vulcanization of Elastomers, edited by G. Alliger and I. J. Sjothum, Reinhold Publishing Corporation, New York, 1964.

The novel compounds having the Formula I are also useful in that they can be reacted with fluosilicic acid to form the fluosilicate salts which in dilute aqueous solution are effective moth-proofing agents as more fully disclosed in U.S. Pats. 2,075,359 and 1,915,334.

The novel compounds having the Formula I are additionally useful as catalysts in the preparation of polyurethanes, both cellular and non-cellular, by reaction of polyisocyanates and polyols, or like active hydrogen compounds, in accordance with procedures well-known in the art; see, for example, Saunders et al. Polyurethanes, Chemistry and Technology vol. II, Interscience Publishers, New York, 1964.

DETAILED DESCRIPTION OF THE INVENTION

In preparing the compounds of the invention having the Formula I, the appropriately substituted uretidine-2-one (II) and the active-hydrogen containing compound (III) are brought together in the presence of the catalyst as hereinbefore defined. The order in which the various reactants are mixed is not critical and can be adjusted to suit any particular circumstance. Advantageously the reactants are brought together in the presence of an inert organic solvent i.e. an organic solvent which is inert under the conditions of the reaction in the sense that it does not enter into reaction with any of the reactants employed nor does it interfere in any other way with the desired course of the reaction. Examples of inert organic solvents are benzene, toluene, xylene, Decalin, Tetralin, chlorobenzene, o-dichlorobenzene, tetrachloroethane, chloroform, dimethylformamide, dioxane, diethylether, and the like.

The proportions in which the reactants are employed in the above process are not critical in the sense that the desired product (I) will be obtained whatever the relative proportions employed. However, in order to obtain reasonable yields of the product (I) it is desirable that the reactant (III) be employed in at least equimolar proportions with respect to the reactant (II). Preferably the active hydrogen containing compound (III) is employed in excess of equimolar proportion with respect to the uretidinone (II) i.e. within the range of about 1 mole to about 100 moles of compound (III) per mole of uretidinone (II). Indeed the hydrogen containing compound (III) is, in many instances, employed in the role of solvent for the reaction as well as reactant.

The amount of the catalyst employed in the process of the invention is advantageously from about 0.1 percent by weight to about 10 percent by weight based on uretidinone (II). Preferably the amount of catalyst employed is within the range of about 0.5 percent by weight to about 2 percent by weight based on uretidinone (II).

The temperature at which the reactants are brought together and allowed to react is advantageously at or slightly below room temperature i.e. within the range of 0° C. to 30° C. Higher temperatures can be employed, if desired, especially in instances where the rate of reaction is relatively slow at room temperature. The only limit on the upper temperature range for the reaction is that the reaction must be carried out below the temperature at which the uretidinone (II) tends to dissociate into the isocyanate and carbodiimide from which it has been obtained (as discussed further below). The temperature at which such dissociation occurs varies depending upon the particular uretidinone imine in question. For any particular compound this dissociation temperature is already known or can be determined readily by simple experimentation. The dissociation temperature of the uretidinone controls the upper limit of temperature range within which the process of the invention can be carried out. The lower limit of temperature is of the order of 0° C. although lower temperatures can be tolerated in certain instances. In general the temperature range is of the order of about 0° C. to about 60° C. Preferably the reaction is carried out at a temperature within the range of about 20° C. to about 50° C.

The time required for the reaction to proceed to the required end point varies widely, from a few minutes to many hours, depending upon the reaction temperature and the particular combination of reactants employed. The progress of the reaction can be followed using analytical procedures well-known in the art. For example, aliquots can be removed from the reaction mixture at intervals and subjected to infrared absorption spectroscopy, paper, thin-layer or vapor phase chromatographic procedures and the like.

When the desired end point has been reached, as determined by one or more of the above methods, the required product (I) can be isolated from the reaction mixture by conventional procedures. For example, since the compound (I) is basic, the reaction mixture can be extracted with aqueous mineral acid and the acid extract then neutralized, using aqueous alkali metal hydroxide, to precipitate the compound (I). The latter can be isolated from the resulting product by filtration in the case of a solid or by solvent extraction in the case of a liquid. The compound (I) so obtained can be purified, if desired, using conventional procedures. For example the compound (I) can be converted to a crystalline acid addition salt and reliberated therefrom by neutralization with aqueous alkali metal hydroxide solution. Alternatively, the compound (I), when its volatility under normal circumstances permits, can be purified by distillation, generally under reduced pressure.

It is to be noted that where $R_1$, $R_2$ and $R_3$ in the starting uretidinone (II) are not all identical, the product of the process hereinbefore described will be a mixture of two isomeric 1,2,3-trisubstituted guanidine-1-carboxylic acid esters or amides. Thus the four-membered ring of the uretidine (II) can be opened, in accordance with the process of the nvention, at either or both of two possible linkages namely those between the 1 and 2 ring positions and between the 2 and 3 ring positions to give either the products of Formula I above or the isomer thereof having the formula

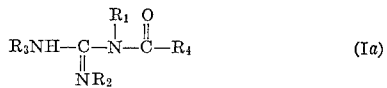

(Ia)

When the groups $R_1$ and $R_3$ are identical the compounds (I) and (Ia) are also identical. However, when $R_1$ and $R_3$ differ the compounds (I) and (Ia) differ. When a mixture of the two different compounds is produced in the process of the invention said mixture can be separated by procedures well-known in the art such as chromatography, counter-current distribution and the like.

The uretidinones (II) which are employed as starting materials in the process of the invention can be prepared by reaction of the appropriation isocyanate $R_3$—N=C=O and appropriate carbodiimide $R_1$—N=C=N—$R_2$. The formation of the uretidinone occurs readily and spontaneously upon mixing of the said isocyanate and said carbodiimide, either in the presence or absence of an inert solvent, according to the following equation.

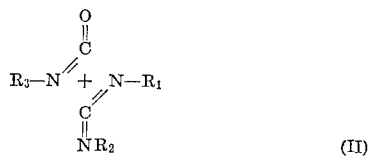

(II)

Indeed the process of the invention described above for the preparation of the compound (I) can be carried out, if desired, by first forming the uretidinoneimine in situ by mixing the appropriate isocyanate and carbodiimide in the reaction vessel. The uretidinone so produced is then converted, without isolation, to the desired compound (I) by adding the appropriate active-hydrogen compound (III) and catalyst to the reaction vessel and allowing the process of the invention to proceed. In this way there is provided a method of proceeding from an isocyanate to a guanidine derivative of the Formula I which is very convenient, particularly in the case wherein the groups $R_1$, $R_2$ and $R_3$ in the desired end product (I) are the same. In this instance the carbodiimide $R_1$—N=C=N—$R_2$ employed in the preparation of the uretidinone (II) can itself be prepared, using catalytic procedures known in the art, from the isocyanate $R_1$NCO which is the other component employed in the formation of the uretidinone. Thus, beginning with the appropriate isocyanate a series of reactions, involving firstly conversion of part of the isocyanate to the carbodiimide, secondly reaction of the remaining isocyanate with the carbodiimide so prepared to yield the uretidinone, and thirdly and finally, conversion of the latter in accordance with the process of the invention, leads directly from the isocyanate to the desired guanidine.

It is to be noted that when the groups $R_1$, $R_2$ and $R_3$ in the isocyanate $R_3$NCO and carbodiimide

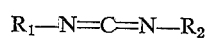

are not identical it is possible to obtain a mixture of products in forming the uretidinone (II). Thus, if $R_1$ and $R_2$ are not identical, two possible uretidinones can be formed depending upon which double bond in the carbodiimide is involved in the adduct formation. Further, even if $R_1$ and $R_2$ are identical it is still possible to obtain a mixture of products if $R_3$ is not identical to $R_1$ and $R_2$. This is so because of the interchange reaction, shown schematically below, which can take place during the uretidinone formation; see, Neumann et al., infra.

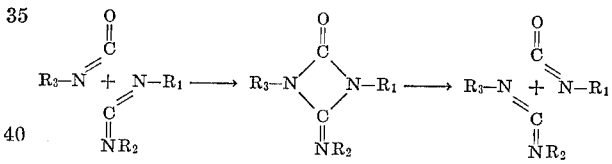

The isocyanate $R_1$NCO and the carbodiimide

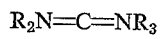

produced in said interchange reaction can each enter into uretidinone formation with the original carbodiimide or isocyanate respectively, thereby forming uretidinones other than the desired one. The occurrence of such interchange reaction can be minimized by carrying out the uretidinone formation at or near room temperature and/or by using a large excess of the starting isocyanate. When a mixture of uretidinones is obtained in the above manner said mixture can, if desired, be separated into its component parts by conventional procedures, such as chromatography, and the components can be submitted individually to the process of the invention. Alternatively the mixture of uretidinones produced as described above can be used directly without separation, in the process of the invention. There is obtained thereby the corresponding mixture of guanidine carboxylic acid derivatives which mixture can, if desired, be separated into its component parts by conventional procedures such as those enumerated above.

The methods used to prepare the carbodiimides $R_1$—N=C=N—$R_2$ from the appropriate isocyanate are those well-known in the art and are inclusive of those catalytic processes set forth in U.S. Pats. 2,840,589; 2,853,473; 2,853,518; 3,056,835; 3,152,131 and 3,157,662. In preparing an unsymmetrical carbodiimide in accordance with such procedures it is merely necessary to employ an equimolar mixture of the corresponding isocyanates and subject said mixture to catalytic conversion in accordance with the above procedures. Alternatively, assymmetrical carbodiimides can be prepared by reaction of the appropriate isocyanate and a symmetrical carbodiimide in accordance with the procedure described, for example, by Neumann et al., Angew. Chem. 74, 801–6, 1962.

The reaction of the isocyanate $R_3NCO$ and the carbodiimide $R_1N=C=NR_2$ to form the corresponding uretidinone (II) is carried out in accordance with procedures well-known in the art for the preparation of such adducts; see, for example, Neumann et al., supra. Generally speaking it is merely necessary to mix the isocyanate and the carbodiimide at a temperature from about 20° C. up to about 100° C. in substantially equimolar proportions, if desired in the presence of an inert solvent such as those exemplified above. The resulting mixture is allowed to remain, or return to, room temperature (circa. 20° C.) until formation of uretidinone is complete.

The active hydrogen containing compounds of the invention of the Formula III are inclusive of the hydroxyl containing compounds $R_5OH$ and the amine

wherein $R_5$, $R_6$ and $R_7$ are as hereinbefore defined. The previous discussion and exemplification of the process of the invention has dealt largely in terms of monofunctional active hydrogen containing compounds e.g. monohydric alcohols and monoamines, as the reactant (III). However, as will be obvious to one skilled in the art, it is possible to employ, as the reactant (III), compounds which contain more than one active hydrogen containing group. Each active hydrogen atom in such polyfunctional reactants (III) is potentially capable of entering into the process of the invention and reacting with a uretidinone (II). For example when a diol $HO-C_nH_{2m}-OH$, wherein $C_nH_{2n}$ represents an alkylene group such as ethylene, propylene, butylene, hexylene and the like, is employed as the active hydrogen containing reactant (III), each of the two active hydrogen atoms of the diol enter into reaction with the uretidinone in accordance with the following:

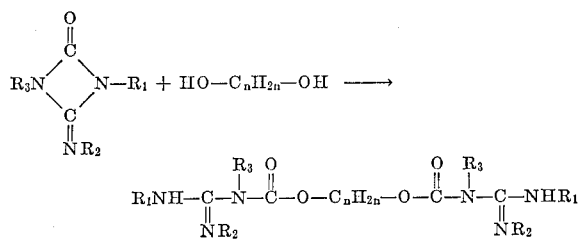

In the above equation $R_1$, $R_2$, $R_3$ and $C_nH_{2n}$ have the significance hereinbefore defined.

Similarly where a trihydric or higher polyhydric alcohol is employed as the active hydrogen containing material the reaction taking place in accordance with the process of the invention will involve the reaction of one molecule of the uretidinone for each active hydrogen atom present in the polyhydric alcohol. The end product will correspond to the structure of the starting polyhydric alcohol wherein each active hydrogen atom has been replaced by the moiety

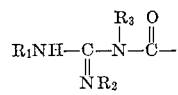

wherein $R_1$, $R_2$ and $R_9$ are as hereinbefore defined. Similarly when the active hydrogen containing compound (III) employed in the process of the invention is a polyfunctional amine or a compound containing both amino and hydroxyl groups the process of the reaction will give rise to a compound corresponding to said starting compound (III) wherein each active hydrogen is replaced by the moiety

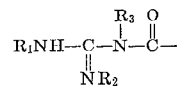

wherein $R_1$, $R_2$, and $R_3$ are as hereinbefore defined.

The above discussion assumes that, in carrying out the process of the invention, the proportions of uretidinone (II) and active hydrogen atom containing compound (III) are such that there is present at least one molar proportion of uretidinone (II) for each active hydrogen atom in the compound (III). As will be understood by one skilled in the art the use of a proportion of uretidinone less than that set forth above will give rise to products which still contain active hydrogen atoms. The compounds so obtained can, if desired, be used again in the process of the invention with a second uretidinone (II) i.e. one differing from that used in the first reaction. There are thereby obtained final products containing two or more different

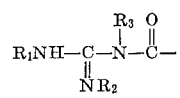

moieties wherein $R_1$, $R_2$ and $R_3$ are as hereinbefore defined. Alternatively the above described compounds, which still contain active hydrogen groups after submission to the process of the invention using less than the amount of uretidinone required to react with all the active hydrogen atoms, can be employed as active hydrogen containing components in the formation of polyurethanes using procedures well-known in the art; see, for example, Saunders et al. supra. In this way there are obtained polyurethanes, both cellular and non-cellular, which contain basic moieties in the molecule and which can therefore be used as ion exchange resins and the like. Further, said products can be converted to ionic forms for example by reaction with mineral or like acids to form the acid addition salts or with alkyl halides and the like to form the corresponding quaternary salts. The ionic forms of the polymer so obtained can be used in plating baths for the electrodeposition of plastic coating on metals and the like using procedures well-known in the art; see, for example, Chemical and Engineering News, Nov. 2, 1966, page 54 and U.S. 3,230,162.

The guanidine derivatives obtained by reaction of uretidinones (II) with polyfunctional active hydrogen containing compounds (III) in accordance with the process of the invention are useful in same manner and for the same purposes as those derived from monofunctional active hydrogen containing compounds (III).

Examples of mono- and polyfunctional active hydrogen compounds which can be employed as the reactant (III) in the process of the invention are: monohydric aliphatic alcohols such as methanol, ethanol, propanol, isopropyl alcohol, butanol, pentanol, dodecanol, octadecanol, allyl alcohol, methallyl alcohol, cyclopentanol, cyclohexanol, cycloheptanol; araliphatic monohydric alcohols such as benzyl alcohol, phenethyl alcohol, 2-naphthylmethanol, benzhydrol and the like; polyhydric aliphatic alcohols such as ethylene glycol, propane - 1,2 - diol, propane-1,3-diol, butane-1,2-diol, hexane-2,3-diol, heptane-1,4-diol, octane-2,3-diol, diethylene glycol, propylene glycol, dipropylene glycol, glycerol, trimethylolpropane, hexane-1,2,3-triol, pentaerythritol, sorbitol, mannitol, α-methyl glucoside, and adducts of said polyhydric alcohols with alkylene oxides such as ethylene oxide, propylene oxide, butylene-1,2-oxide, and the like; phenols such as phenol itself, o-cresol, m-cresol, p-cresol, resorcinol, catechol, hydroquinone and the like; alkanolamines such as ethanolamine, propanolamine, butanolamine, diethanolamine, triethanolamine, diisopropanolamine, dibutanolamine, dihexanolamine, and the like; aliphatic monoamines such as methylamine, ethylamine, butylamine, isohexylamine, octylamine, dodecylamine, allylamine, methallylamine, cyclopentylamine, cyclohexylamine, cycloheptylamine, and the like; aromatic monoamines such as aniline, o-toluidine, p-toluidine, p-anisidine, o-xylidine, 4-diphenylylamine, α-naphthylamine, β-naphthylamine, and the like; aliphatic polyamines such as ethylenediamine, propane-1,3-diamine, butane-1,4-diamine, pentane-1,3-diamine, hexane-2,4-diamine, and the like; aromatic polyamines such as benzidine, 3,3'-dichlorobenzidine, 3,3'-dimethoxybenzidine, 4,4'-methylenedianiline, 4,4' - methylenedi(2 - chloroaniline), 2,4-toluenediamine, 2,6-toluenediamine, mixtures of 2,4- and 2,6-toluenediamines, mixtures of polyamines obtained by acid condensation of aniline and formaldehyde, and the like.

As set forth above, the catalysts employed in the process of the invention, are inclusive of saturated lower aliphatic acids, alkali metal salts of said acids, mixtures of said acids and of the alkali metal salts thereof, and alkali metal derivatives of phenols and of lower-alkanols. These various catalysts have been defined and exemplified above. For the most part any of said catalysts, or a combination of two or more thereof, can be employed as catalyst for the reaction of any given combination of uretidinone (II) and active hydrogen containing compound (III). However, when the active hydrogen atom of the compound (III) is present in the form of an hydroxyl group the use of a lower alkanoic acid as the sole catalyst generally gives unsatisfactory results. In such instances it is necessary to combine the lower-alkanoic acid with a minor portion of any of the other catalysts set forth above and preferably with a minor portion of an alkali metal salt of the same or a different lower alkanoic acid. All the other catalysts listed above, taken alone or in combination, give satisfactory results with any combination of uretidinone and active hydrogen containing compound.

While the process and compositions of the invention have been discussed and exemplified above in terms of a monomeric uretidinone (II), i.e. a uretidinone derived from a monocarbodiimide, the process of the invention can be applied to the reaction of active hydrogen compounds (III) with a polymeric uretidinone. Examples of the latter are uretidinones derived by reacting a polycarbodiimide, such as those derived by reacting polyisocyanates with carbodiimide-forming catalysts in accordance with procedures such as those described in U.S. Pats. 3,254,036; 3,200,087 and 2,941,966, with the appropriate isocyanate using the procedures hereinbefore described for the preparation of uretidinones. The amount of isocyanate employed in said preparation is advantageously of the order of at least 1 molar proportion of isocyanate for each carbodiimide link in the polycarbodiimide. Preferably the isocyanate is employed in excess of 1 molar proportion per carbodiimide link. When polyuretidinones of the above type are subjected to the process of the invention, using an active hydrogen containing compound (III) in an amount corresponding to at least 1 molar proportion for each uretidinone group in the polyuretidinone, there is obtained a poly(guanidine carboxylic acid derivative) in which the recurring unit can be represented as follows:

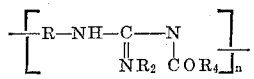

wherein $R_2$ and $R_4$ are as hereinbefore defined and R is the hydrocarbyl residue corresponding to the di- or polyisocyanate, e.g. $R(NCO)_2$, from which is derived the original polycarbodiimide employed in making the polyuretidinone starting material. The above poly(guanidine carboxylic acid derivatives) so obtained can be converted to an ionic form by reaction with mineral and like acids to form the acid addition salts or by reaction with alkyl halides and the like to form quaternary salts. The ionic forms of the polymer so obtained can be used in the electroplating of plastics, metals and the like in accordance with the procedures already outlined above in respect of the corresponding use of similar products obtained by preparation of polyurethanes from polyols derived in accordance with the process of the invention.

In a further aspect of the process and compositions of the invention the uretidinones (II) employed in the process of the invention can contain capped isocyanato groups as substituents in one or more of the hydrocarbyl groups $R_1$, $R_2$ and $R_3$. After the uretidinone (II) containing such groups has been converted to the corresponding guanidine-carboxylic acid derivative (I) said isocyanato groups can be reliberated by removing the capping agent e.g. by heating above the dissociation temperature of capped group. The compound (I) containing free isocyanato groups can then be used as the polyisocyanate component in the preparation of polyurethanes in accordance with the procedures well-known in the art; see, Saunders et al., supra. The polyurethanes so obtained can be converted to ionic forms, using procedures hereinbefore described, and employed in electroplating of metals and the like using procedures discussed and exemplified above.

In a particular illustration of the use of uretidinones (II) containing "capped" isocyanate groups, the uretidinone starting material can be prepared by reacting a polyisocyanate e.g. a diisocyanate, with a carbodiimide in such proportions (equimolar) that only one of the isocyanato groups is involved in uretidinoneimine formation. The free isocyanato group in the uretidinone is then capped using procedures well-known in the art:-see, for example U.S. Pats. 2,683,727; 2,683,728; 2,683,729; 2,698,845; 2,725,385 and 2,733,261.

The carbodiimide employed in making the uretidinone may itself contain isocyanato groups which are also capped using procedures well-known in the art: see, for has been formed. For example the uretidinoneimine (II) can be formed from 4,4'-methylenebis(phenyl isocyanate) on the one hand and the monocarbodiimide prepared from 4,4'-methylenebis(phenyl isocyanate) on the other hand in accordance with the following equation:

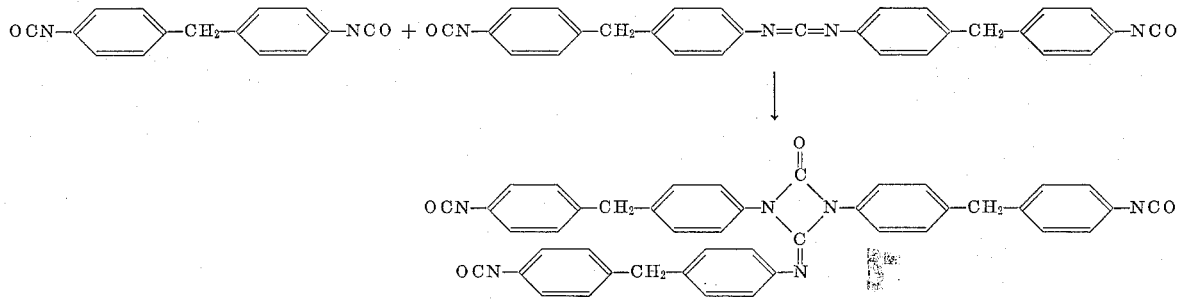

Such uretidinoneimines can be prepared from any di- or polyisocyanate and any isocyanato-substituted monocarbodiimide the latter being derived from the same or a different carbodiimide by procedures hereinbefore described. Said isocyanato substituted uretidinoneimines can be prepared by reaction of the individual components which have been separately formed or, alternatively, can be prepared in situ by converting a portion of a polyisocyanate to the corresponding carbodiimide and then permitting uretidinoneimine formation to take place by reaction of the carbodiimide with unreacted polyisocyanate. Examples of procedures for carrying out such processes are those set forth in (1) U.S. 3,097,191 wherein methylenebis(phenyl isocyanate) is heated at a temperature above 150° C. until less than 33% of the isocyanato groups originally present have been converted to carbodiimide groups and then allowing the reaction mixture to cool below 50° C. whereupon uretidinoneimine formation occurs and (2) British Pat. 918,454 wherein a diisocyanate is treated with a minor portion of a carbodiimide such as diphenylcarbodiimide and a portion of the starting diisocyanate is converted to an isocyanato substituted carbodiimide which is then permitted to react with unconverted starting diisocyanate to form the corresponding uretidinoneimine.

The isocyanate groups in the isocyanato-substituted uretidinoneimine produced in the above manner can, if desired, be "capped" using procedures hereinbefore described and the capped material subjected to the process of the invention, after which the capping agents are removed as hereinbefore described. The isocyanato-substituted guanidine derivatives so obtained can then be employed as the isocyanate component in the preparation of polyurethanes and like polymers using procedures well-known in the art. The resulting polyurethanes can be converted to ionic form and used in the manner hereinbefore described in electrodeposition and the like.

Alternatively the isocyanato-substituted uretidinoneimines particularly those which are prepared, as hereinbefore described, in the presence of an excess of di- or polyisocyanate, can be employed directly as the isocyanate component, or part of the isocyanate component, in the preparation of polyurethanes both cellular and non-cellular. This can be done using procedures conventional in the art, see, Saunders et al. supra, using either the one shot or prepolymer methods. In the prepolymer method the isocyanato-substituted uretidinoneimine is reacted with less than one equivalent amount of a conventional polyol to give an isocyanato-terminated prepolymer from which the ultimate polyurethane is prepared by reaction with further polyol in the presence of catalysts and other conventional additives. In the one shot procedure the isocyanato-substituted uretidinoneimine is admixed with all the other components (polyol, catalyst, and conventional additives) and the polyurethane is prepared without prior reaction of two or more components.

The polyurethanes prepared from the isocyanato-substituted uretidinoneimine carry the uretidinoneimine moiety at intervals throughout the polymer chain. Said polyurethanes can accordingly be submitted to the process of the invention to convert each uretidinoneimine moiety to the corresponding guanidinecarboxylic acid moiety. The procedures employed and the mode of converting the end products to ionic forms for use in electrodeposition are the same as those described above for the corresponding conversion of the polyuretidinones derived from polycarbodiimides.

The following preparations and examples describe the manner and process of making and using the invention and set forth the best mode contemplated by the inventors of carrying out the invention but are not to be construed as limiting.

PREPARATION 1

1,3-diphenyl-4-phenyliminouretidine-2-one

A mixture of 197 g. (1.01 mole) of diphenylcarbodiimide and 120 g. (1.0 mole) of phenylisocyanate and 1.0 g. of cuprous chloride was stirred and heated at approximately 80° C. for four hours. The reaction mixture was cooled to approximately 20° C. and then filtered. The solid so isolated was washed with petroleum ether and recrystallized from ethyl acetate. There was thus obtained 1,3-diphenyl-4-phenyliminouretidine-2-one in the form of a white crystalline solid having a melting point of 137 to 138° C.

Similarly, using the above procedure but replacing phenyl isocyanate by butyl isocyanate, hexyl isocyanate, octyl isocyanate, dodecyl isocyanate, allyl isocyanate, methallyl isocyanate, cyclohexyl isocyanate, cyclooctyl isocyanate, benzyl isocyanate, β-phenethyl isocyanate, benzhydryl isocyanate, α-naphthylmethyl isocyanate, o-tolyl isocyanate, 2-naphthyl isocyanate, and 4-phenylyl isocyanate there are obtained:

1-butyl-, 1-hexyl-, 1-octyl-, 1-dodecyl-, 1-allyl-, 1-methallyl-, 1-cyclohexyl-, 1-cyclooctyl-, 1-benzyl-, 1-β-phenethyl-, 1-benzhydryl-, 1-α-naphthylmethyl-, 1-o-tolyl-, 1-(2-naphthyl)-, and 1-(4-biphenylyl)- 3-phenyl-4-phenyliminouretidin-2-one.

Similarly using the above procedure, but replacing diphenyl carbodiimide by dibutyl carbodiimide, di-pentyl carbodiimide, dioctylcarbodiimide, didodecylcarbodiimide, dicyclohexyl carbodiimide, diallyl carbodiimide, di-o-tolylcarbodiimide, di-p-tolylcarbodiimide, di-2-naphthylcarbodiimide, dibenzylcarbodiimide, di(4-chlorophenyl)carbodiimide, di(3-methoxyphenyl)carbodiimide, di(4-ethylthiophenyl)carbodiimide, di(2-allyloxyphenyl)carbodiimide, di(4-nitrophenyl)carbodiimide and di(3-cyanophenyl)carbodiimide, there are obtained:

1-phenyl-3-butyl-4-butylimino-,
1-phenyl-3-pentyl-4-pentylimino-,
1-phenyl-3-octyl-4-octylimino-,
1-phenyl-3-dodecyl-4-dodecylimino-,
1-phenyl-3-cyclohexyl-4-cyclohexylimino-,
1-phenyl-3-allyl-4-allylimino-,
1-phenyl-3-o-tolyl-4-o-tolylimino-,
1-phenyl-3-p-tolyl-4-p-tolylimino-,
1-phenyl-3-(2-naphthyl)-4-(2-naphthylimino)-,
1-phenyl-3-benzyl-4-benzylimino-,
1-phenyl-3-(4-chlorophenyl)-4-(4-chlorophenylimino)-,
1-phenyl-3-(3-methoxyphenyl)-4-(3-methoxyphenylimino)-,
1-phenyl-3-(4-ethylthiophenyl)-4-(4-ethylthiophenylimino)-,
1-phenyl-3-(2-allyloxyphenyl)-4-(2-allyloxyphenylimino)-,
1-phenyl-3-(4-nitrophenyl)-4-(4-nitrophenylimino)-, and
1-phenyl-3-(3-cyanophenyl)-4-(3-cyanophenylimino) uretidin-2-one, respectively.

EXAMPLE 1

Butyl 1,2,3-triphenylguanidine-1-carboxylate

A mixture of 200 g. of butanol and 600 g. of bromoform was prepared under nitrogen in a closed container. A 300 g. portion of this mixture was transferred under nitrogen to a reaction flask fitted with stirrer, reflux condenser and drying tubes to exclude moisture. The mixture was stirred vigorously while a total of 6.0 g. of 1,3-diphenyl-4-phenylimino-uretidin-2-one was added. No reaction was observed to take place after stirring for a period of about 15 minutes. At the end of this time 0.1 g. of sodium phenoxide was added to the mixture with stirring. The reaction mixture immediately turned pink and exothermic reaction began. The temperature of the reaction mixture reached a maximum of 105° C. approximately 1 hr. after the addition of the catalyst. The resulting mixture was cooled to 20° C. and a portion (164 g.) was evaporated to dryness under reduced pressure. The residue was a pinkish white solid which was stirred with petroleum ether and the solid (3.3 g.) isolated therefrom by filtration. The solid so isolated was recrystallized from petroleum ether to yield 2.7 g. (including second crop) of butyl 1,2,3-triphenylguanidine-1-carboxylate in the form of a crystalline solid having a melting point of 114 to 115° C.

*Analysis.*—Calcd. for $C_{24}H_{25}N_3O_2$ (percent): C, 74.39; H, 6.50; N, 10.84; M.W. 387.5. Found (percent): C, 74.64; H, 6.79; N, 11.07; M.W. 400.

EXAMPLE 2

*Butyl 1,2,3-triphenyl guanidine-1-carboxylate*

A solution of 6.01 g. of 1,3-diphenyl-4-phenylimino-uretidin-2-one in a mixture of 75 g. of butanol and 225 g. of benzene was stirred at approximately 25° C. and 0.1 g. of sodium butoxide was added. An immediate exothermic reaction took place and appeared to be complete, based on infrared analysis of an aliquot, in approximately 5 minutes. The resulting reaction mixture was evaporated to dryness under reduced pressure and the residue was recrystallized from hexane. There was thus obtained butyl 1,2,3-triphenylguanidine-1-carboxylate in the form of a crystalline solid identical with the material prepared as described in Example 1.

EXAMPLE 3

*Methyl 1,2,3-triphenylguanidine-1-carboxylate*

To a solution of 1.034 g. of 1,3-diphenyl-4-phenylimino-uretidin-2-one in 40 ml. of benzene was added a solution of 0.1 g. of sodium phenoxide in 10 ml. of methanol. The mixture was allowed to stand for a short period before being washed with water and the organic layer separated and evaporated to dryness. The residue (1.05 g.) had a melting point of 117 to 118° C. and was identified by thin layer chromatography as a mixture of methyl 1,2,3-triphenylguanidine-1-carboxylate and 1,2,3-triphenylguanidine.

EXAMPLE 4

*Phenyl 1,2,3-triphenylguanidine-1-carboxylate*

A mixture of 4.0 g. of 1,3-diphenyl-4-phenylimino-uretidin-2-one and 30 g. of phenol in 150 g. of benzene was heated with stirring to 51° C. At this point 0.2 g. of sodium phenoxide was added and the mixture was stirred for 30 minutes before being cooled and washed with water (2 portions of 200 ml.). The washed organic layer was distilled under reduced pressure to remove benzene and then at 60° C./4.4 mm. of mercury to remove excess phenol. The residue (6.2 g.) was shown by thin layer chromatography to be a mixture of 1,2,3-triphenylguanidine and phenyl 1,2,3-triphenylguanidine-1-carboxylate. The mixture is separated chromatographically using an activated alumina column which is eluted with a mixture of acetone and hexane. There is thus obtained phenyl 1,2,3-triphenylguanidine-1-carboxylate in the form of a solid having a melting point of 125 to 127° C.

*Analysis.*—Calcd. for $C_{26}H_{21}N_3O_2$ (percent): C, 76.64; H, 5.19; N, 10.31. Found (percent): C, 76.6; H, 5.1; N, 10.1.

EXAMPLE 5

*N,N-dibutyl 1,2,3-triphenylguanidine-1-carboxamide and the hydrochloride thereof*

A solution of 6.0 g. of 1,3-diphenyl-4-phenylimino-uretidine-2-one in 225 g. of benzene was stirred while 5 ml. of dibutylamine was added at approximately 28° C. The mixture was stirred for 5 minutes at the end of which time no reaction was found to have taken place (infrared spectroscopic analysis of aliquot). A further 5 ml. of dibutylamine was accordingly added and, after 30 minutes, a further 10 ml. of dibutylamine was added. No reaction had been observed to take place after stirring the reaction mixture for a further 2 hr. and gradually raising the temperature to 62° C. At the end of this time a final 5 ml. of dibutylamine was added and the mixture was stirred at 60° C. for a further 30 minutes before adding 1 ml. of glacial acetic acid. The resulting mixture was stirred for a further 8 hr. at 60° C. before being cooled to room temperature. The mixture so obtained was evaporated to a small volume under reduced pressure and acidified (to litmus) with dilute aqueous hydrochloric acid. The acidified product was extracted with chloroform, the chloroform extract was washed with water and then evaporated to dryness. The resinous solid residue was treated with hot hexane and the white solid which separated was isolated by filtration. There was thus obtained N,N-dibutyl 1,2,3-triphenylguanidine-1-carboxamide hydrochloride in the form of an hygroscopic solid having a melting point of 156° C.

*Analysis.*—Calcd. for $C_{28}H_{35}ClON_4$ (percent): C, 70.20; H, 7.36; N, 11.70. Found (percent): C, 70.08; H, 7.39; N, 11.86.

A portion of the hydrochloride was dissolved in methanol and the resulting solution was made alkaline to litmus by the addition of 4% aqueous sodium hydroxide solution. The mixture so obtained was extracted with chloroform and the chloroform extract was evaporated to dryness to yield N,N-dibutyl 1,2,3-triphenylguanidine-1-carboxamide in the form of a white solid.

EXAMPLE 6

*Methyl 1,2,3-triphenylguanidine-1-carboxylate*

A solution of 1.5 g. of 1,3-diphenyl-4-phenylimino-uretidine-2-one in 62.5 g. of benzene was stirred and a solution of 0.5 g. of sodium acetate and 0.5 g. of glacial acetic acid in 20 g. of methanol was added thereto. The reaction mixture was stirred at room temperature (circa 26° C.) for 24 hr. and then at 50° C. for 4 hr. The resulting product was evaporated to dryness and the residue washed with water to give methyl 1,2,3-triphenylguanidine-1-carboxylate. The latter is purified by chromatography on activated alumina using hexane-acetone mixture as the eluate.

EXAMPLE 7

*Butyl 1,2,3-tri[4-(4-isocyanatobenzyl)phenyl] guanidine-1-carboxylate*

The uretidine-2-one starting material employed in this example was prepared in the following manner.

A mixture of 2748 g. of 4,4'-methylene bis(phenyl isocyanate) [I.E.=125, containing 2% 2,4'-isomer] and 82 g. of triethylphosphate was heated with stirring at 200 to 215° C. for 4.5 hr. The resulting mixture was cooled to 100° C. and then allowed to cool further. When the temperature reached 70° C. the mixture was stirred and stirring was continued, maintaining the temperature at 55° C. to 70° C., for 4 hrs. At the end of this time the mixture was allowed to cool to room temperature (circa 25° C.). There was thus obtained a mixture containing approximately 25 percent by weight of 1,3-di-[4-(4 - isocyanatobenzyl)phenyl] - 4 - (4-isocyanatobenzyl) phenyl]iminouretidin-2-one, and 50 percent of higher oligomers [poly(uretidinoneimines)], the remainder of said mixture being unchanged 4,4'-methylene bis(phenylisocyanate). The isocyanate equivalent of the mixture was 218.4.

The isocyanato groups in the above product were then capped, by conversion to the corresponding poly(butyl carbamates), as follows:

A portion (25 g.) of the product obtained as described above was dissolved in 200 g. of benzene and to the resulting mixture was added 50 g. of butanol. The mixture so obtained was milky initially but rapidly clarified on continued stirring. The clarified mixture was allowed to stand overnight at approximately 25° C. At the end of this time the mixture was found, by infrared spectroscopic analysis of an aliquot, to be free from uncapped isocyanato groups. There was thus obtained a solution containing a mixture of 1,3-di[4-(4-butoxycarbonylaminobenzyl)phenyl]-4-[4-(4-butoxycarbonylaminobenzyl)phenyl]iminouretidin - 2-one and di-(4-butoxycarbonylaminophenyl)methane.

The solution so obtained was then subjected to the process of the invention using the following procedure:

The solution of capped uretidinone prepared as described above was treated in its entirety by admixture with a solution of 0.12 g. of sodium butoxide in 10 ml. of butanol. The temperature of the reaction mixture rose rapidly from 25° C. to 30° C. An aliquot of the reaction mixture removed therefrom about 30 minutes after the above mixing, indicated no remaining uretidine-2-one (infrared absorption maxima at 7.3μ) and showed the infrared absorption band (6.04μ) characteristic of the —C=N— bond. The bulk of the reaction mixture was stirred and maintained at about 25° C. for a short period and then evaporated to dryness using a rotary evaporator. The residue was extracted several times with hot petroleum ether to remove excess butanol and the residual solid was slurried with water to remove sodium butoxide. The slurry was extracted with chloroform and the chloroform layer was concentrated by evaporation before being diluted with petroleum ether. The solids which separated were isolated by filtration. There was thus obtained a mixture of butyl 1,2,3-tri-[4-(4-butoxycarbonylaminobenzyl)phenyl]guanidine-1-carboxylate and di-(4-butoxycarbonylaminophenyl)methane in the form of a crystalline solid. Said mixture is separated into its component parts by chromatography on activated alumina using acetone-hexane mixtures as eluate. The capped isocyanate groups in said mixture, or in the individual components isolated therefrom, are regenerated by heating to 200° C. whereby there are obtained butyl 1,2,3-tri-[4-(4-isocyanatobenzyl)phenyl]guanidine-1-carboxylate and 4,4'-methylenebis(phenyl isocyanate).

EXAMPLE 8

A solution was prepared by dissolving 27.3 g. (0.125 equiv) of the mixture of 1,3-di-[4-(4-isocyanatobenzyl)-phenyl] - 4 - [4-(4-isocyanatobenzyl)phenyl]iminouretidin-2-one and 4,4'-methylenebis(phenyl isocyanate), obtained as described for the starting material of Example 7, in 200 ml. of dioxane. The solution so obtained was added slowly at 35 to 40° C. to a solution of 45 g. (0.5 mole) of 1,4-butane diol in 100 ml. of dioxane. There was thus obtained a hydroxy-terminated prepolymer containing uretidine-2-one moieties the presence of which was confirmed by the appearance of the characteristic infrared absorption band at 7.3μ. An aliquot (60 g.) of the solution of said prepolymer so obtained was treated by the addition of 0.1 g. of sodium phenoxide. An exothermic reaction took place immediately and when the reaction had subsided the infrared absorption spectra of an aliquot showed the absence of the band at 7.3μ characteristic of uretidin-2-one and the presence of a band at 6.04μ characteristic of the —C=N— bond. The reaction product so obtained was evaporated to dryness and the residue was washed thoroughly with water before being dried. There was thus obtained a hydroxy-terminated prepolymer containing guanidine-carboxylate moieties, useful as a polyol component in the preparation of polyurethanes which latter will contain the basic guanidine moiety in the chains thereof.

EXAMPLE 9

Using the procedure described in Example 2, but replacing the sodium butoxide employed as catalyst by sodium methoxide, there is obtained butyl 1,2,3-triphenylguanidine-1-carboxylate.

Similarly, using the procedure described in Example 2, but replacing the sodium butoxide catalyst by potassium methoxide, sodium ethoxide, lithium butoxide, potassium isobutoxide, potassium o-cresylate, sodium resorcinolate, and the like, there is obtained butyl 1,2,3-triphenylguanidine-1-carboxylate in comparable yield.

EXAMPLE 10

Using the procedure described in Example 6, but replacing the combination of sodium acetate and glacial acetic acid employed as catalyst by a combination of sodium butyrate and butyric acid, there is obtained methyl 1,2,3-triphenylguandine-1-carboxylate.

Similarly, using the procedure described in Example 6, but replacing the sodium acetate/glacial acetic acid catalyst by a combination of sodium hexanoate and hexanoic acid there is obtained methyl 1,2,3-triphenylguanidine-1-carboxylate in comparable yield.

EXAMPLE 11

*Butyl 1-butyl-2,3-diphenylguanidine-1-carboxylate and butyl 1,2-diphenyl-3-butylguanidine-1-carboxylate*

Using the procedure described in Example 2, but replacing 1,3-diphenyl-4-phenyliminouretidine-2-one by 1-butyl-3-phenyl-4-phenyliminouretidine-2-one, there is obtained a mixture of butyl 1-butyl-2,3-diphenylguanidine-1-carboxylate and butyl 1,2-diphenyl-3-butylguanidine-1-carboxylate.

Similarly, using the procedure described in Example 2, but replacing 1,3-diphenyl-4-phenyliminouretidine-2-one by 1-hexyl-, 1-octyl-, 1-dodecyl-, 1-allyl-, 1-methallyl-, 1-cyclohexyl-, 1-cyclooctyl-, 1-benzyl-, 1-β-phenethyl-, 1-benzhydryl-, 1-α-naphthylmethyl-, 1-o-tolyl-, 1-(2-naphthyl)-, and 1-(4-biphenylyl)-3-phenyl-4-phenyliminouretidine-2-one, there are obtained:

a mixture of butyl 1-hexyl-2,3-diphenyl- and butyl 1,2-diphenyl-3-hexylguanidine-1-carboxylate
a mixture of butyl 1-octyl-2,3-diphenyl- and butyl 1,2-diphenyl-3-octylguanidine-1-carboxylate
a mixture of butyl 1-dodecyl-2,3-diphenyl- and butyl 1,2-diphenyl-3-dodecylguanidine-1-carboxylate
a mixture of butyl 1-allyl-2,3-diphenyl- and butyl 1,2-diphenyl-3-allylguanidine-1-carboxylate
a mixture of butyl 1-methallyl-2,3-diphenyl- and butyl 1,2-diphenyl-3-methallylguanidine-1-carboxylate
a mixture of butyl 1-cyclohexyl-2,3-diphenyl- and butyl 1,2-diphenyl-3-cyclohexylguanidine-1-carboxylate
a mixture of butyl 1-cyclooctyl-2,3-diphenyl- and butyl 1,2-diphenyl-3-cyclooctylguanidine-1-carboxylate
a mixture of butyl 1-benzyl-2,3-diphenyl- and butyl 1,2-diphenyl-3-benzylguanidine-1-carboxylate
a mixture of butyl 1-β-phenethyl-2,3-diphenyl- and butyl 1,2-diphenyl-3-β-phenethylguanidine-1-carboxylate
a mixture of butyl 1-benzhydryl-2,3-diphenyl- and butyl 1,2-diphenyl-3-benzhydrylguanidine-1-carboxylate
a mixture of butyl 1-α-naphthylmethyl-2,3-diphenyl- and butyl 1,2-diphenyl-3-α-naphthylmethyl-guanidine-1-carboxylate
a mixture of butyl 1-o-tolyl-2,3-diphenyl- and butyl 1,2-diphenyl-3-o-tolylguanidine-1-carboxylate
a mixture of butyl 1-(2-naphthyl)-2,3-diphenyl- and butyl 1,2-diphenyl-3-(2-naphthyl) guanidine-1-carboxylate, and
a mixture of butyl 1-(4-biphenylyl)-2,3-diphenyl- and butyl 1,2-diphenyl-3-(4-biphenylyl)guanidine-1-carboxylate, respectively.

EXAMPLE 12

*Butyl 1-phenyl-2,3-dibutylguanidine-1-carboxylate and butyl 1,2-dibutyl-3-phenylguanidine-1-carboxylate*

Using the procedure described in Example 2, but replacing 1,3-diphenyl-4-phenyliminouretidin-2-one by 1-phenyl-3-butyl-4-butyliminouretidin-2-one, there is obtained a mixture of butyl 1-phenyl-2,3-dibutylguanidine-1-carboxyylate and butyl 1,2-dibutyl-3-phenylguanidine-1-carboxylate which mixture is separated by chromatography using activated alumina as substrate.

Similarly, using the procedure described in Example 2, but replacing 1,3-diphenyl - 4 - phenyliminouretidin-2-one by:

1-phenyl-3-pentyl-4-pentylimino-,
1-phenyl-3-octyl-4-octylimino-,
1-phenyl-3-dodecyl-4-dodecylimino-,
1-phenyl-3-cyclohexyl-4-cyclohexylimino-,
1-phenyl-3-allyl-4-allylimino-,
1-phenyl-3-o-tolyl-4-o-tolylmino-,
1-phenyl-3-p-tolyl-4-p-tolylimino-,
1-phenyl-3-(2-naphthyl)-4-(2-naphthylimino)-,
1-phenyl-3-benzyl-4-benzylimino-,
1-phenyl-3-(4-chlorophenyl)-4-(4-chlorophenylimino)-
1-phenyl-3-(3-methoxyphenyl)-4-(3-methoxyphenylimino)-, 1-phenyl-3-(4-ethylthiophenyl)-4-(4-ethylthio-
   phenylimino)-,
1-phenyl-3-(2-allyloxyphenyl)-4-(2-allyloxy-
   phenylimino)-,
1-phenyl-3-(4-nitrophenyl)-4-(4-nitrophenylimino)-, or
1-phenyl-3-(3-cyanophenyl)-4-(3-cyanophenylimino)
   uretidine-2-one, there are obtained:

a mixture of butyl 1-phenyl-2,3-dipentyl- and butyl
   1,2-dipentyl-3-phenylguanidine-1-carboxylate,
a mixture of butyl 1-phenyl-2,3-dioctyl- and
   butyl 1,2-dioctyl-3-phenylguanidine-1-carboxylate,
a mixture of butyl 1-phenyl-2,3-didodecyl- and butyl
   1,2-didodecyl-3-phenylguanidine-1-carboxylate,
a mixture of butyl 1-phenyl-2,3-dicyclohexyl- and butyl
   1,2-dicyclohexyl-3-phenylguanidine-1-carboxylate,
a mixture of butyl 1-phenyl-2,3-diallyl- and butyl 1,2-
   diallyl-3-phenylguanidine-1-carboxylate,
a mixture of butyl 1-phenyl-2,3-di-o-tolyl- and butyl
   1,2-di-o-tolyl-3-phenylguanidine-1-carboxylate,
a mixture of butyl 1-phenyl-2,3-di-p-tolyl- and butyl 1,2-
   di-p-tolyl-3-phenylguanidine-1-carboxylate,
a mixture of butyl 1-phenyl-2,3-di(2-naphthyl)- and butyl
   1,2-di(2-naphthyl)-3-phenylguanidine-1-carboxylate,
a mixture of butyl 1-phenyl-2,3-dibenzyl- and butyl 1,2-
   dibenzyl-3-phenylguanidine-1-carboxylate,
a mixture of butyl 1-phenyl-2,3-di(4-chlorophenyl)- and
   butyl 1,2-di(4-chlorophenyl)-3-phenylguanidine-1-
   carboxylate,
a mixture of butyl 1-phenyl-2,3-di(3-methoxphenyl)- and
   butyl 1,2-di(3-methoxyphenyl)-3-phenylguanidine-1-
   carboxylate,
a mixture of butyl 1-phenyl-2,3-di(4-ethylthiophenyl)-
   and butyl 1,2-di(4-ethylthiophenyl)-3-phenylguani-
   dine-1-carboxylate,
a mixture of butyl 1-phenyl-2,3-di(2-allyloxyphenyl)- and
   butyl 1,2-di(2-allyloxyphenyl)-3-phenylguanidine-1-
   carboxylate,
a mixture of butyl 1-phenyl-2,3-di(4-nitrophenyl)- and
   butyl 1,2-di(4-nitrophenyl)-3-phenylguanidine-1-
   carboxylate, and
a mixture of butyl 1-phenyl-2,3-di(3-cyanophenyl)-
   and butyl 1,2-di(3-cyanophenyl)-3-phenylguanidine-1-
   carboxylate, respectively.

EXAMPLE 13

*Octyl 1,2,3-triphenyl guanidine-1-carboxylate*

Using the procedure described in Example 1, but replacing butanol by octanol, there is obtained octyl 1,2,3-triphenylguanidine-1-carboxylate.

Similarly using the procedure described in Example 1, but replacing butanol by isohexanol, cyclohexyl alcohol, cyclooctyl alcohol, 1-cyclohexenyl alcohol, allyl alcohol, benzyl alcohol, benzhydryl alcohol, 1-naphthol, or 2-phenyl-ethanol, there are obtained isohexyl, cyclohexyl, cyclooctyl, 1-cyclohexenyl, allyl, benzyl, benzhydryl, 1-naphthyl, and phenethyl 1,2,3-triphenyl guanidine-1-carboxylate.

EXAMPLE 14

*N-phenyl 1,2,3-triphenyl guanidine-1-carboxylate*

Using the procedure described in Example 5, but replacing dibutylamine by aniline, there is obtained N-phenyl 1,2,3-triphenyl guanidine-1-carboxylate.

Similarly, using the procedure described in Example 5, but replacing dibutylamine by N-methylaniline, cyclohexylamine, allylamine, dimethylamine, methylethylamine, 1-naphthylamine, benzylamine, 2-chloroaniline, 4-methoxyaniline, 3-fluoroaniline, 4-cyanoaniline, 4-nitroaniline, or 4-allyloxyaniline, there are obtained:

N-methyl-N-phenyl, N-cyclohexyl, N-allyl, N,N-dimethyl, N-methyl-N-ethyl, N-(1-naphthyl), N-benzyl, N-(2-chlorophenyl), N-(4-methoxyphenyl), N-(3-fluorophenyl), N-(4-cyanophenyl), N-(4-nitrophenyl), and N-(4-allyloxyphenyl) 1,2,3-triphenyl guanidine-1-carboxylate, respectively.

We claim:
1. A guanidine having the formula:

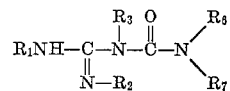

wherein $R_1$, $R_2$, $R_3$, $R_6$ and $R_7$ each represent hydrocarbyl from 1 to 18 carbon atoms, inclusive, and $R_6$ additionally represents hydrogen.

2. N,N-dibutyl 1,2,3-triphenylguanidine-1-carboxamide.
3. Butyl 1,2,3 - tri - [4-(4-butoxycarbonylaminobenzyl) phenyl] guanidine-1-carboxylate.
4. A process for the preparation of a 1,2,3-hydrocarbylguanidine 1-carboxylic acid derivative having the formula

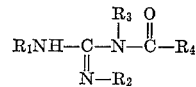

wherein $R_1$, $R_2$, and $R_3$ each represent hydrocarbyl from 1 to 18 carbon atoms, inclusive, and $R_4$ is selected from the class consisting of —$OR_5$ and

wherein $R_5$, $R_6$ and $R_7$ each represent hydrocarbyl from 1 to 18 carbon atoms, inclusive, and $R_6$ additionally represents hydrogen, which process comprises reacting, at a temperature below that at which the starting material dissociates, a uretidine-2-one imine of the formula:

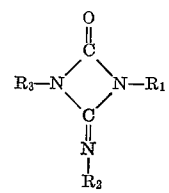

wherein $R_1$, $R_2$ and $R_3$ have the significance hereinabove defined, with an active hydrogen containing compound $R_4H$ wherein $R_4$ is as hereinabove defined, in the presence of a catalyst selected from the group consisting of a saturated lower aliphatic acid, an alkali metal salt of a saturated lower aliphatic acid, a mixture of a saturated lower aliphatic acid and the alkali metal salt of a saturated lower aliphatic acid, the alkali metal derivative of a phenol, and the alkali metal salt of a lower alkanol, provided that when a lower saturated aliphatic acid is employed as catalyst in the reaction of the above identified uretidinone imine with a compound $R_4H$ which contains the active hydrogen atom in the form of a hydroxyl group a portion of said lower saturated aliphatic acid is present in the form of an alkali metal salt thereof.

5. A process for the preparation of a hydrocarbyl 1,2,3-hydrocarbylguanidine-1-carboxylate having the formula:

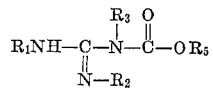

wherein $R_1$, $R_2$, $R_3$ and $R_5$ represent hydrocarbyl from 1 to 18 carbon atoms, inclusive, which process comprises reacting at a temperature below that at which the starting material dissociates, a uretidinone imine of the formula:

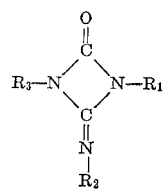

wherein $R_1$, $R_2$ and $R_3$ have the significance hereinabove defined, with an active hydrogen containing compound $R_5OH$ wherein $R_5$ is as hereinabove defined, in the presence of a catalyst selected from the group consisting of the alkali metal salt of a lower saturated aliphatic acid, a mixture of a lower saturated aliphatic acid and the alkali metal salt of a lower saturated aliphatic acid, the alkali metal derivative of a phenol and the alkali metal salt of a lower-alkanol.

6. A process for the prepration of a 1,2,3-hydrocarbyl-guanidine-1-carboxamide having the formula:

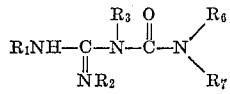

wherein $R_1$, $R_2$, $R_3$, $R_6$ and $R_7$ each represent hydrocarbyl from 1 to 18 carbon atoms, inclusive, and $R_7$ additionally represents hydrogen, which process comprises reacting, at a temperature below that at which the starting material dissociates, a uretidinone imine of the formula:

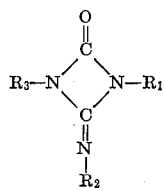

wherein $R_1$, $R_2$ and $R_3$ have the significance hereinabove defined, with an amine

wherein $R_6$ and $R_7$ are as hereinbefore defined, in the presence of a catalyst selected from the group consisting of a lower saturated aliphatic acid, an alkali metal salt of a lower saturated aliphatic acid, a mixture of a lower saturated aliphatic acid and an alkali metal salt of a lower saturated aliphatic acid, an alkali metal salt of a phenol and an alkali metal salt of a lower-alknol.

References Cited

FOREIGN PATENTS 1,138,390  10/1962  Germany _____ 260—239

OTHER REFERENCES

Junod, Helv. Chim. Acta., vol. 35 (1952), No. 127, QD R14, pp. 1005 to 1019 relied on.

LORRAINE A. WEINBERGER, Primary Examiner

L. A. THAXTON, Assistant Examiner

U.S. Cl. X.R.

252—401; 260—45.85, 45.9, 77.5, 239, 239.3, 287, 302, 326, 326.3, 465, 465.4, 468, 470, 479, 482, 553